United States Patent
Gao et al.

(10) Patent No.: US 10,090,016 B2
(45) Date of Patent: *Oct. 2, 2018

(54) VARIABLE WRITTEN TRACK WIDTHS FOR ATTRIBUTE-BASED STORAGE

(71) Applicant: Seagate Technology LLC, Cupertino, CA (US)

(72) Inventors: Kaizhong Gao, North Oaks, MN (US); Wenzhong Zhu, Apple Valley, MN (US); Tim Rausch, Farmington, MN (US); Edward Gage, Lakeville, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/667,904

(22) Filed: Aug. 3, 2017

(65) Prior Publication Data

US 2017/0330587 A1    Nov. 16, 2017

Related U.S. Application Data

(63) Continuation of application No. 14/688,598, filed on Apr. 16, 2015, now Pat. No. 9,747,942.

(60) Provisional application No. 62/110,989, filed on Feb. 2, 2015, provisional application No. 62/083,696, filed
(Continued)

(51) Int. Cl.
| | | |
|---|---|---|
| *G11B 5/02* | (2006.01) | |
| *G11B 20/12* | (2006.01) | |
| *G11B 5/012* | (2006.01) | |
| *G11B 5/00* | (2006.01) | |
| *G11B 5/60* | (2006.01) | |
| *G11B 5/48* | (2006.01) | |
| *G11B 7/0037* | (2006.01) | |
| *G11B 20/10* | (2006.01) | |

(52) U.S. Cl.
CPC .......... *G11B 20/1217* (2013.01); *G11B 5/012* (2013.01); *G11B 5/02* (2013.01); *G11B 20/1258* (2013.01); *G11B 5/4866* (2013.01); *G11B 5/6088* (2013.01); *G11B 7/0037* (2013.01); *G11B 2005/0021* (2013.01); *G11B 2020/1087* (2013.01); *G11B 2020/10888* (2013.01); *G11B 2020/1238* (2013.01); *G11B 2020/1264* (2013.01); *G11B 2020/1292* (2013.01)

(58) Field of Classification Search
None
See application file for complete search history.

(56) References Cited

U.S. PATENT DOCUMENTS

| | | | |
|---|---|---|---|
| 4,030,130 | A | 6/1977 | Smith |
| 4,152,736 | A | 5/1979 | Jansen et al. |
| 4,298,897 | A | 11/1981 | Arter et al. |

(Continued)

FOREIGN PATENT DOCUMENTS

| | | | |
|---|---|---|---|
| EP | 484774 | A2 | 5/1992 |
| EP | 1564736 | A2 | 8/2005 |

(Continued)

*Primary Examiner* — Brian Butcher
(74) *Attorney, Agent, or Firm* — Holzer Patel Drennan

(57) ABSTRACT

A storage device controller is configured to select one of multiple written track widths for a storage location based on a write attribute of data to be recorded at the storage location. According to one implementation, the storage device controller is further configured to select a power level for a heat-assisted magnetic recording (HAMR) device based on the write attribute.

18 Claims, 6 Drawing Sheets

Related U.S. Application Data on Nov. 24, 2014, provisional application No. 62/083,732, filed on Nov. 24, 2014.

(56) References Cited

U.S. PATENT DOCUMENTS

| | | |
|---|---|---|
| 4,535,372 A | 8/1985 | Yeakley |
| 4,622,601 A | 11/1986 | Isozaki et al. |
| 4,646,168 A | 2/1987 | Sonobe et al. |
| 4,771,346 A | 9/1988 | Shoji et al. |
| 4,803,571 A | 2/1989 | Fujioka et al. |
| 4,853,799 A | 8/1989 | Aikawa |
| 5,010,430 A | 4/1991 | Yamada et al. |
| 5,285,341 A | 2/1994 | Suzuki et al. |
| 5,402,270 A | 3/1995 | McDonnell et al. |
| 5,760,993 A | 6/1998 | Purkett |
| 5,892,634 A | 4/1999 | Ito et al. |
| 5,978,168 A | 11/1999 | Mathews et al. |
| 6,052,797 A | 4/2000 | Ofek et al. |
| 6,104,562 A | 8/2000 | Ottesen et al. |
| 6,185,063 B1 | 2/2001 | Cameron |
| 6,412,042 B1 | 6/2002 | Paterson et al. |
| 6,710,960 B1 | 3/2004 | Yorimitsu |
| 6,768,605 B2 | 7/2004 | Yamamoto |
| 7,130,152 B1 | 10/2006 | Raymond et al. |
| 7,259,927 B2 | 8/2007 | Harris |
| 7,393,066 B2 | 7/2008 | Dugas et al. |
| 7,440,222 B2 | 10/2008 | Nakamura et al. |
| 7,508,619 B2 | 3/2009 | Okamoto et al. |
| 7,573,682 B2 | 8/2009 | Pust et al. |
| 7,872,829 B2 | 1/2011 | Sakai |
| 7,907,360 B2 | 3/2011 | Mak et al. |
| 7,957,093 B2 | 6/2011 | Brand |
| 7,965,465 B2 | 6/2011 | Sanvido et al. |
| 8,023,215 B1 | 9/2011 | Ghaly et al. |
| 8,139,318 B2 | 3/2012 | Biskeborn |
| 8,310,777 B2 | 11/2012 | Biskeborn et al. |
| 8,310,782 B2 | 11/2012 | Song et al. |
| 8,531,792 B1 | 9/2013 | Burd et al. |
| 8,531,793 B2 | 9/2013 | Bandic et al. |
| 8,537,481 B1 | 9/2013 | Bandic |
| 8,599,510 B1 | 12/2013 | Fallone |
| 8,693,123 B1 | 4/2014 | Guo et al. |
| 8,699,159 B1 | 4/2014 | Malina |
| 8,699,162 B1 | 4/2014 | Grobis et al. |
| 8,711,517 B2 | 4/2014 | Erden et al. |
| 8,854,752 B2 | 10/2014 | Jin et al. |
| 8,867,161 B2 | 10/2014 | Emo et al. |
| 8,873,178 B2 | 10/2014 | Erden et al. |
| 8,913,335 B2 | 12/2014 | Coker et al. |
| 8,917,469 B1 | 12/2014 | Guo et al. |
| 8,929,186 B1 | 1/2015 | Sharma et al. |
| 8,976,478 B1 | 3/2015 | Harllee, III et al. |
| 9,053,712 B1 | 6/2015 | Guo et al. |
| 9,058,829 B1 | 6/2015 | Wolf et al. |
| 9,082,458 B1 | 7/2015 | Tang |
| 9,087,541 B1 | 7/2015 | Pokharel et al. |
| 9,099,103 B1 | 8/2015 | Krichevsky |
| 9,105,302 B1 | 8/2015 | Erden et al. |
| 9,111,575 B1 | 8/2015 | Zhou et al. |
| 9,111,578 B1 | 8/2015 | Hassel et al. |
| 9,129,658 B1 | 9/2015 | Yamamoto |
| 9,142,232 B2 | 9/2015 | Edelman et al. |
| 9,142,246 B1 | 9/2015 | Trantham et al. |
| 9,153,287 B1 | 10/2015 | Hamilton et al. |
| 9,324,362 B1 | 4/2016 | Gao |
| 9,396,062 B1 | 7/2016 | Sridhara et al. |
| 9,418,688 B1 | 8/2016 | Rausch et al. |
| 9,508,362 B2 | 11/2016 | Gao et al. |
| 2002/0035666 A1 | 3/2002 | Beardsley et al. |
| 2002/0035704 A1 | 3/2002 | Wilson |
| 2002/0105867 A1 | 8/2002 | Tamaru et al. |
| 2003/0214886 A1 | 11/2003 | Sakamoto et al. |
| 2005/0078399 A1 | 4/2005 | Fung et al. |
| 2005/0157597 A1 | 7/2005 | Sendur et al. |
| 2006/0215511 A1 | 9/2006 | Shin et al. |
| 2007/0047415 A1 | 3/2007 | Chang |
| 2007/0050593 A1 | 3/2007 | Chen et al. |
| 2007/0174582 A1 | 7/2007 | Feldman |
| 2008/0002272 A1 | 1/2008 | Riedel |
| 2008/0239901 A1 | 10/2008 | Tsunokawa et al. |
| 2008/0316639 A1 | 12/2008 | Tang et al. |
| 2009/0244775 A1 | 10/2009 | Ehrlich |
| 2009/0251821 A1 | 10/2009 | Song et al. |
| 2010/0014183 A1 | 1/2010 | Aoki et al. |
| 2010/0027406 A1 | 2/2010 | Krause et al. |
| 2010/0271727 A1 | 10/2010 | Namkoong et al. |
| 2010/0321817 A1 | 12/2010 | Aida et al. |
| 2012/0014013 A1 | 1/2012 | Bandic et al. |
| 2012/0194946 A1 | 8/2012 | Watanabe et al. |
| 2013/0148225 A1 | 6/2013 | Coker et al. |
| 2013/0155826 A1 | 6/2013 | Zhang et al. |
| 2013/0294207 A1 | 11/2013 | Erden et al. |
| 2014/0016224 A1 | 1/2014 | Unoki et al. |
| 2014/0043708 A1 | 2/2014 | Erden et al. |
| 2014/0055881 A1 | 2/2014 | Zaharris |
| 2014/0153134 A1 | 6/2014 | Han et al. |
| 2014/0160589 A1 | 6/2014 | Deki et al. |
| 2014/0285923 A1 | 9/2014 | Aoki et al. |
| 2014/0327983 A1 | 11/2014 | Biskeborn et al. |
| 2015/0178161 A1 | 6/2015 | Burd et al. |
| 2016/0148630 A1 | 5/2016 | Rausch |
| 2016/0148635 A1 | 5/2016 | Zhu et al. |
| 2016/0148636 A1 | 5/2016 | Ma et al. |
| 2016/0148637 A1 | 5/2016 | Rausch et al. |
| 2016/0148642 A1 | 5/2016 | Gao |
| 2016/0148643 A1 | 5/2016 | Gao et al. |
| 2016/0148644 A1 | 5/2016 | Zhu et al. |
| 2016/0148645 A1 | 5/2016 | Zhu et al. |

FOREIGN PATENT DOCUMENTS

| | | |
|---|---|---|
| JP | H02-240862 A2 | 9/1990 |
| WO | 2005-030869 A1 | 4/2005 |

VARIABLE WRITTEN TRACK WIDTHS FOR ATTRIBUTE-BASED STORAGE

CROSS-REFERENCE TO RELATED APPLICATIONS

The present application is a continuation application of U.S. Nonprovisional patent application Ser. No. 14/688,598, entitled "Variable Written Track Widths for Attribute-Based Storafe" filed on Apr. 16, 2015 which claims benefit of priority to U.S. Provisional Patent Application No. 62/110,989, entitled "Variable Written Track Widths for Attribute-Based Storage" and filed on Feb. 2, 2015 and U.S. Provisional Application No. 62/083,696, entitled "Interlaced Magnetic Recording in HAMR Devices" filed on Nov. 24, 2014, and also to U.S. Provisional Patent Application No. 62/083,732, entitled "Interlaced Magnetic Recording" and filed on Nov. 24, 2014. All of these applications are specifically incorporated by reference for all that they disclose or teach.

BACKGROUND

Heat assisted magnetic recording (HAMR) generally refers to the concept of locally heating a recording medium to reduce the coercivity of the recording medium so that an applied magnetic writing field can more easily affect magnetization of the recording medium during a temporary magnetic softening of the recording medium caused by the local heating. HAMR allows for the use of small grain media, with a larger magnetic anisotropy at room temperature to assure sufficient thermal stability, which is desirable for recording at increased areal densities. HAMR can be applied to any type of storage media, including for example, tilted media, longitudinal media, perpendicular media, and/or patterned media.

One drawback to recording technologies such as HAMR is that a written size of magnetic bits is reduced when writing at high linear densities, ultimately limiting an achievable areal density capability (ADC). Better designs are needed to increase ADC in storage media of HAMR devices.

BRIEF DESCRIPTIONS OF THE DRAWINGS

SUMMARY

Implementations disclosed herein provide a storage device controller configured to select one of multiple written track widths for a storage location based on a write attribute of data to be recorded at the storage location.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

Figure 1:
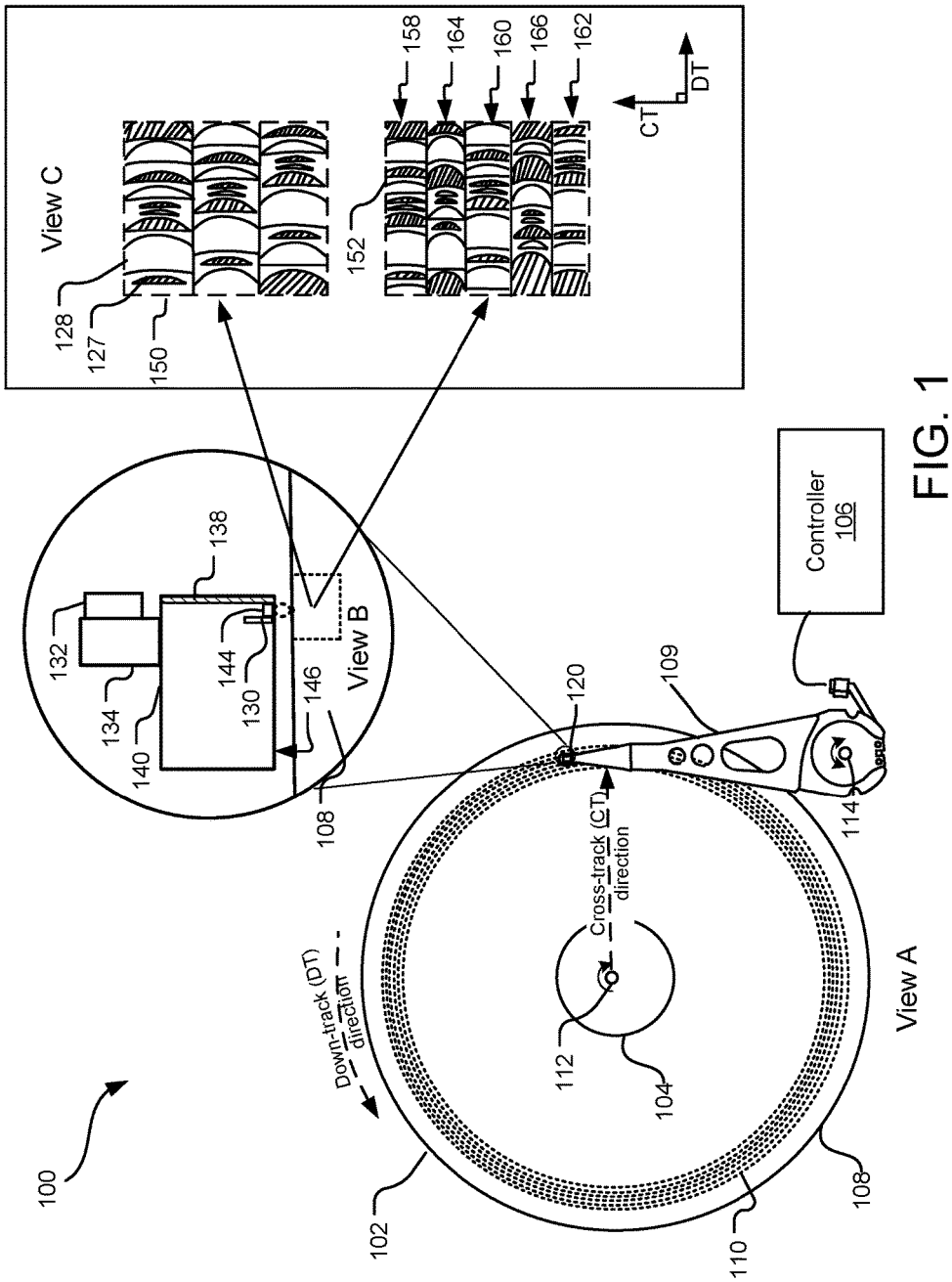
FIG. 1 illustrates a data storage device including a transducer head assembly for writing data on a magnetic storage medium.

FIG. 1 illustrates a data storage device 100 including a transducer head assembly 120 for writing data on a magnetic storage medium 108. Although other implementations are contemplated, the magnetic storage medium 108 is, in FIG. 1, a magnetic storage disc on which data bits can be recorded using a magnetic write pole (e.g., a write pole 130) and from which data bits can be read using a magnetoresistive element (not shown). As illustrated in View A, the storage medium 108 rotates about a spindle center or a disc axis of rotation 112 during rotation, and includes an inner diameter 104 and an outer diameter 102 between which are a number of concentric data tracks 110. Information may be written to and read from data bit locations in the data tracks on the storage medium 108.

The transducer head assembly 120 is mounted on an actuator assembly 109 at an end distal to an actuator axis of rotation 114. The transducer head assembly 120 flies in close proximity above the surface of the storage medium 108 during disc rotation. The actuator assembly 109 rotates during a seek operation about the actuator axis of rotation 112. The seek operation positions the transducer head assembly 120 over a target data track for read and write operations.

In one implementation employing HAMR (e.g., View B), magnetic grains on the storage medium 108 are temporarily heated during the recording process to selectively lower magnetic coercivity in a tightly focused area of the storage medium 108 that substantially corresponds to an individual data bit. The heated region is then encoded with the recorded data bit based on the polarity of an applied magnetic write field. After cooling, the magnetic coercivity substantially returns to its pre-heating level, thereby stabilizing the magnetization for that data bit. This write process is repeated for multiple data bits on the storage medium, and such data bits can be read using a magneto-resistive read head.

Referring to View B, the transducer head assembly 120 includes, among other features, a heat source 132 (e.g., a laser) coupled to a submount assembly 134. Light from the heat source 132 is directed into a waveguide 138 mounted to a slider 140. Light exiting the waveguide is focused, via a Near Field Transducer (NFT) 144, and applied to a bit location on the storage medium 108 just before the bit location is subjected to a magnetic pulse generated by the write pole 130. As an air-bearing surface 146 of the slider 140 "flies" across the surface of the storage medium 108, the write pole 130 selectively magnetizes the underlying magnetic grains of the storage medium 108.

View C illustrates magnified views 150 and 152 of magnetic polarized regions (e.g., individual data bits or groupings of data bits of like polarity) recorded on storage medium 108 according to different write methodologies and settings of the storage device 100. The polarized regions are also referred to herein as "data bits" (e.g., data bits 127, 128), which each represent one or more individual data bits of a same state (e.g., 1s or 0s). For example, the data bit 127 is a magnetically polarized region representing multiple bits of a first state (e.g., "000"), while the adjacent data bit 128 is an oppositely polarized region representing one or more bits of a second state (e.g., a single "1").

The different magnified views 150 and 152 of View C generally illustrate comparative differences based on two different write methodologies. In particular, the magnified view 150 illustrates data bits recorded according to a conventional magnetic recording (CMR) technique. Under CMR, all data tracks have substantially equal written track width. Each of the individual data tracks is randomly writable, but a maximum attainable ADC is reduced as compared to an interlaced magnetic recording (IMR) technique described below with respect to the magnified view 152. As used herein, a data track is "randomly writable" when the data track can be individually re-written multiple times without significantly degrading data on other adjacent data tracks. An adjacent data track is "significantly degraded" if reading the data track results in a number of read errors in excess of a maximum number of errors that can be corrected by an correction code (ECC) of the data storage device 100. According to one implementation, the recorded data bits of view 150 are recorded while firing the heat source 132 at a relatively constant power.

The magnified view 152 illustrates magnetic transitions recorded according to an IMR technique. IMR utilizes alternating data tracks of different written track widths arranged with slightly overlapping written track boundaries so that a center-to-center distance between directly adjacent tracks (e.g., the track pitch) is uniform across the surface of the magnetic medium 108. For example, the IMR technique shown in the magnified view 152 illustrates alternating data tracks of two different written track widths. A first series of alternating tracks (e.g., the tracks 158, 160, and 162) have a wider written track width than a second series of interlaced data tracks (e.g., 164 and 166).

In the magnified view 152, each wide data track of the first series is written before the narrow and directly adjacent data tracks of the second series. For example, the data track 160 is written before data is written to either of the data tracks 164 and 166. Data writes to the data tracks 164 and 166 overwrite outer edge portions of the data track 160; however, the data track 160 is still readable due to sufficient information retained in a center region of the data track.

Because each data track of wide written track width is written prior to directly adjacent data tracks of narrower written track width, the data tracks of the wider written track width (e.g., data tracks 158, 160, and 162) are also referred to herein as "bottom tracks," while the alternating data tracks of narrower written width (e.g., the data tracks 164 and 166) are referred to herein as "top tracks." In one implementation, the bottom tracks of wider written track width include data stored at a higher linear density than the top tracks of narrower written track width.

Variability in written track width, such as that illustrated in magnified view 152, can be accomplished differently in different types of recording systems. In systems utilizing HAMR, (as in FIG. 1), a written track width can be altered by changing operating power of the heat source 132 of the HAMR head. Increasing power of the heat source 132 increases a resulting written track width, while decreasing power of the heat source 132 decreases a resulting written track width.

In perpendicular recording systems that do not utilize HAMR, variability in written track width can be achieved by writing data to different data tracks with two or more non-identical write elements. For example, a first write element with a wide pole can record data tracks of wide written width (e.g., the bottom tracks), while a second write element with a narrower write pole can record data tracks of narrower written width (e.g., the top tracks). The disclosed technology is described primarily with respect to HAMR recording systems; however, it should be understood that such technology may be suitable for use in other non-HAMR recording systems as well, such as conventional perpendicular magnetic recording.

By manipulating written track width of various data tracks, linear densities of various data tracks, and an order in which the various data tracks are written, a storage system can be tuned to exhibit a number of characteristics superior to those currently provided by CMR and SMR systems. In some situations, the techniques disclosed herein are contemplated for adaptation and use within CMR and SMR-type systems.

In one implementation, a controller 106 of the data storage device 100 selects a potential storage location for incoming data based on written track width of the storage location and based one or more write attributes of the data. Write attributes include, for example, a data type (e.g., user data, system data, etc.), a write frequency of the data (e.g., how frequently the data is written), a write recency (e.g., how recently the data was last updated or re-written), performance sensitivity of the data, data size, etc. For example, the controller 106 of the storage device 100 may determine that data of a write command is associated with a high read or write frequency and select a written data track width associated with a randomly writable storage location, such as a top data track in a system implementing the IMR technique shown in magnified view 152.

Other storage characteristics (in addition to written track width) may also influence the selection of a storage location for data. In various implementations, the selection of the storage location by the controller 106 is also based, for example, on a radial location of the storage location on the storage medium 108 (e.g., inner diameter, outer diameter, middle diameter). For example, the storage device controller 106 may direct data that is particularly performance sensitive to a region of the storage medium 108 where performance is demonstrably higher, such as the outer diameter (OD) of the storage medium. Performance sensitive data refers to data for which a higher data is preferable. For example, a user or controlling module may designate certain types of read/write operations as higher priority (e.g., more performance sensitive) than other types. This higher priority data can be stored in regions of the storage medium 108 associated with higher data rates.

In another implementation, the controller 106 writes data associated with a high read or write frequency (e.g., cache data) to a designated cache region having data tracks of wider written track width than other data tracks on the storage medium 108. A variety of other attribute-based selective storage actions are explored in detail below with reference to other figures.

In yet another implementation, the controller 106 selects a storage location and associated write track width based on an available storage capacity of the storage medium 108. For example, the controller may write data exclusively to alternating data tracks for a period of time as the storage medium 108 begins to fill up. If the storage medium 108 stores no data or a small amount of data, the wide "bottom" data tracks may be used to store incoming data. Once the storage medium 108 reaches a set capacity, the controller 106 starts directing data to the narrower "top" data tracks.

The controller 106 includes software and/or hardware, and may be implemented in any tangible computer-readable storage media within or communicatively coupled to the storage device 100. The term "tangible computer-readable storage media" includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can accessed by mobile device or computer. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal.

Figure 2:
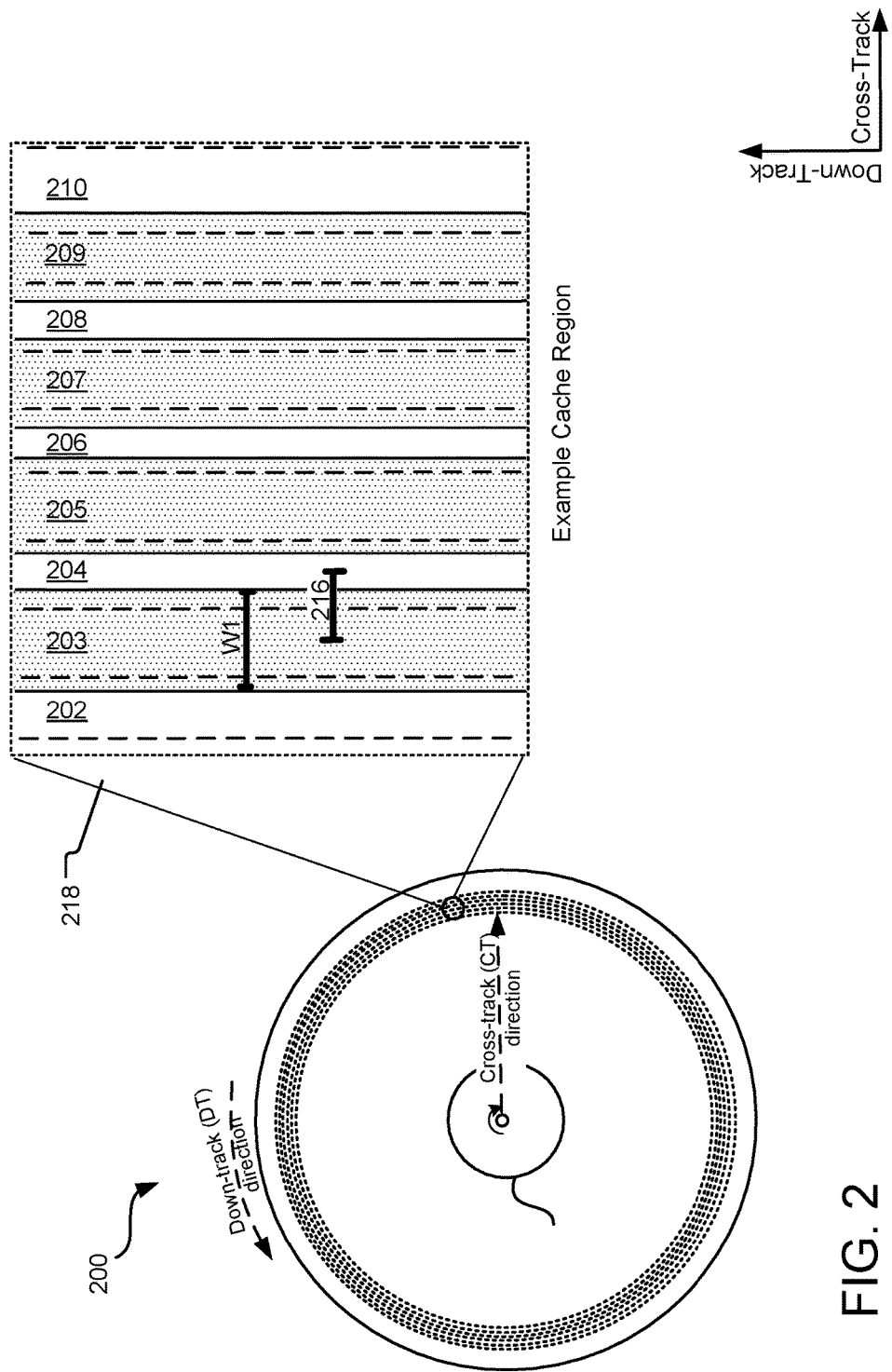
FIG. 2 illustrates a magnetic disc with an example cache region including features for random access and high linear density storage.

FIG. 2 illustrates a magnetic disc 200 with an example cache region 218 including features for random access and high linear density storage. Within the cache region 218, dotted lines indicate the natural boundaries between data tracks defined to have a same track pitch 216 (e.g., center-to center distance between two adjacent data tracks). Alternating data tracks (e.g., odd-numbered data tracks including data tracks 203, 205, 207, and 209) are designated for data storage (i.e., "data-storing data tracks") while interlaced data tracks (e.g., even-numbered data tracks 202, 204, 206, etc.) are designated "spacer data tracks" where no data is stored.

Each of the designated data-storing data tracks stores data at a written track width (W1) that is wider than the defined track pitch 216. For example, the data track 203 has a written track width that is so wide that edges of the data stored in the data track 203 overlaps (e.g., "bleed" across) the natural track boundaries and into the spaces defined by tracks 202 and 204, respectively. In one implementation, the defined track pitch 216 is different within the cache region 218 than within another region of the magnetic disc.

In one implementation, the written track width W1 of the data-storing tracks is wider than a written track width of data tracks included elsewhere (e.g., in non-cache regions) of the storage medium. The wide written track width is accomplished, for example, by writing data with a wide write pole or by operating a HAMR write head at a high power while writing the data. In one implementation, the written track width of the spacer tracks (e.g., the spacer track 202) is wide enough to accommodate data storage under certain conditions. In another implementation, the spacer tracks do not store data under any circumstances and exist solely to prevent data degradation between adjacent data-storing tracks.

Each of the data-storing data tracks is randomly writable so long as data is not stored in either of the immediately adjacent spacer data tracks. For example, the data track 203 can be updated and re-written multiple times without significantly degrading data elsewhere, so long as data is not stored in the immediately adjacent data tracks 202 and 204. Because each of the data-storing tracks is randomly writable, the illustrated implementation yields increased cache-related drive performance as compared to systems with caches that do not allow for random data writes (e.g., SMR and some IMR systems). Further, the especially wide written track width W1 of the data-storing data tracks allows data in the cache region 218 to be stored at very high linear densities while keeping a bit error rate (BER) at or below a predetermined acceptable level.

In various implementations, the cache region 218 spans various regions of the magnetic disc 208. For example, the cache region 218 may be located near the inner diameter (ID), middle diameter (MD), and/or outer diameter (OD) of the magnetic disc 200. It may be advantageous to store the cache region 218 at or near a region of the magnetic disc 200 known to have increased performance as to other regions. For example, systems that may observe higher performance at the OD of the magnetic disc 200 may locate the cache region 218 near the OD of the magnetic disc 200.

In one implementation, a storage device controller (not shown) selectively directs data to the cache 218 and to one or more user data regions (not shown) based on write attributes of the data. For example, data addressed to logical block addresses (LBAs) associated with a high write frequency may be designated as "hot data" that can be copied into the cache region 218 to facilitate quicker data access.

As used herein, "hot data" refers to data that is likely to be accessed frequently or again in the near future, while the term "cold data" refers to data that is likely to be accessed less frequently or sit untouched for longer than hot data. For example, data may be "hot" if it is written or updated with a write frequency satisfying some threshold (e.g., updated every few hours or days). Likewise, data may be "cold" if stays intact for a longer period of time, such as a month, several months, or even years. In at least one implementation, the terms "hot data" and "cold data" refer to a read frequency of data instead of (or in addition to) a write frequency of data. In still other implementations, data is identified as "hot" or "cold" based on recency of last access (e.g., if it has been accessed within some recent time period such as a few hours, days, etc.).

Figure 3:
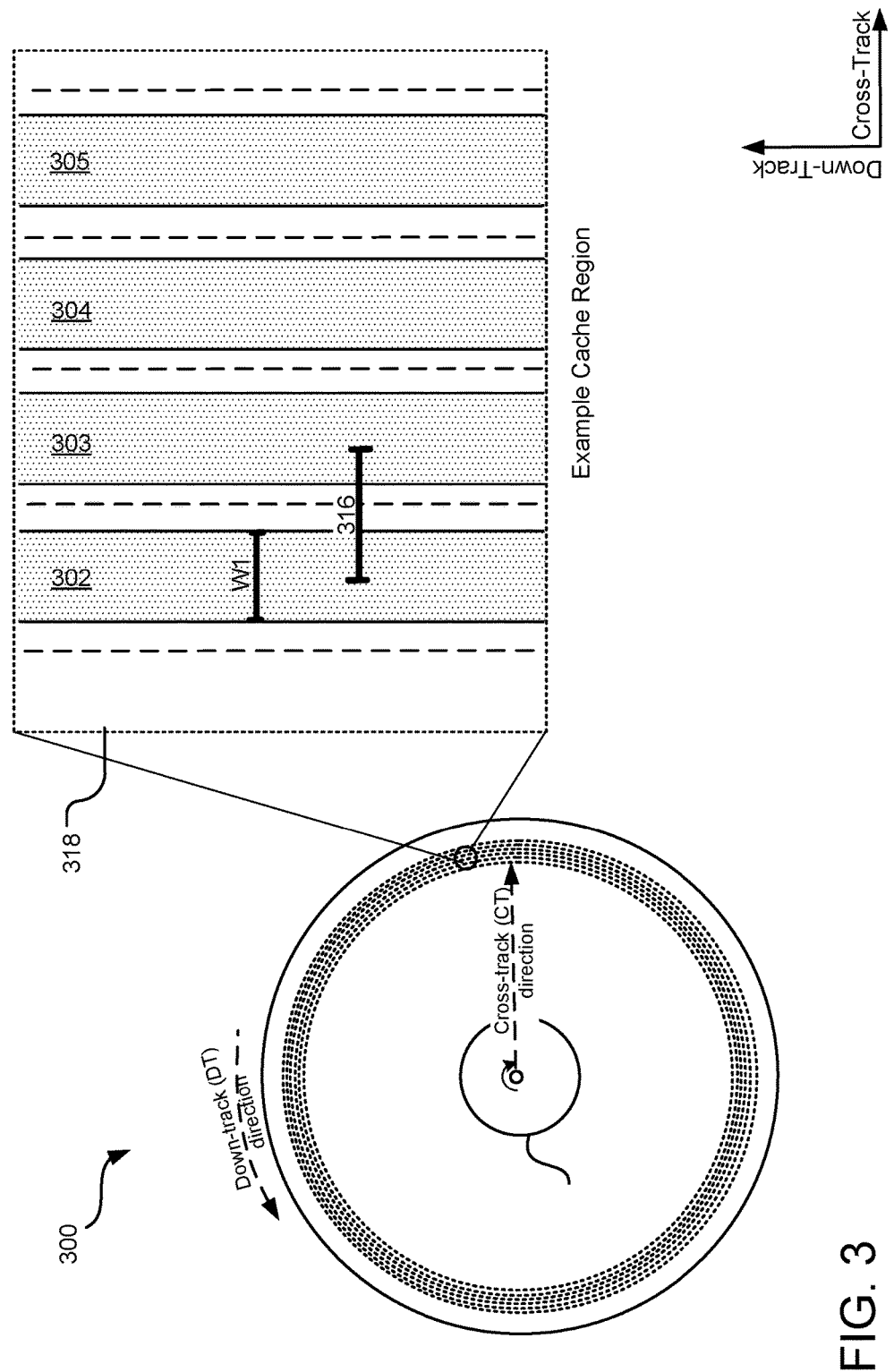
FIG. 3 illustrates a magnetic disc with another example cache region including features for random access and high linear density storage.

FIG. 3 illustrates a storage system 300 with another example cache region 318 including features for random access and high linear density storage. The cache region 318 provides some or all of the same advantages as the cache region 218 described with respect to FIG. 2; however, the cache region 318 defines natural track boundaries (indicated by dotted lines) differently than the storage system of FIG. 2.

Specifically, the natural boundaries in the cache region 318 are defined such that all data tracks have a same track pitch 316 (e.g., center-to center distance between two adjacent data tracks), but a written track width (W1) of each data track is less than the track pitch 316. The written track width W1 of data tracks in the cache region 318 may be greater than a written track width of other data tracks in non-cache regions of the storage medium 308. The wide written track width W1 is accomplished, for example, by writing data with a wide write pole or by operating a HAMR write head at a high power while writing the data. The written track width W1 is selected to ensure a high linear density that also guarantees that each of the data tracks in the cache region 318 is randomly writable.

Figure 4:
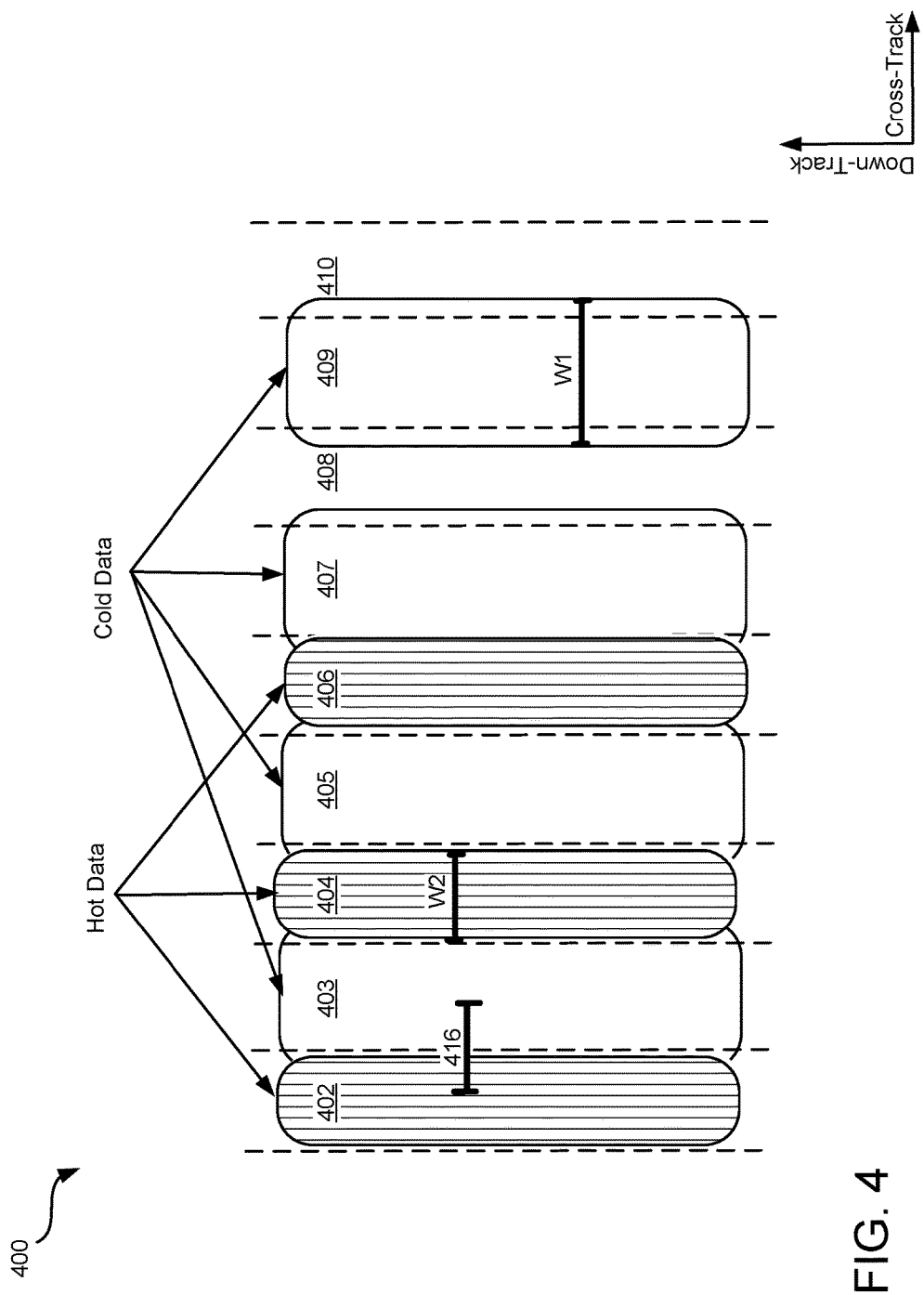
FIG. 4 illustrates example data direction and storage within a region of a storage medium implementing an interlaced magnetic recording (IMR) technique.

FIG. 4 illustrates data direction and storage within an IMR region 400 of a storage medium implementing an IMR technique. The IMR region 400 may be, for example, a radial zone of a magnetic disc or an entire surface of a magnetic disc. The region includes a number of data tracks (e.g., data tracks 402-410). For illustration, some of the data tracks (e.g., data tracks 402-407 and 409) are shown to include data while other data tracks (e.g., data tracks 408 and 410) are shown blank.

In FIG. 4, dotted lines indicate boundaries between adjacent data tracks having a same track pitch 416. The track pitch 416 of each data track is defined to be smaller than a first written track width (W1) of alternating data tracks 403, 405, 407, and 409 (collectively, "the bottom tracks"). A series of data tracks interlaced with the bottom tracks (e.g., data tracks 402, 404, 406, 408, and 410) (collectively, the "top tracks") have a second written track width (W2), which is smaller than the first written track width (W1) and less than or approximately equal to the defined track pitch 416.

In one implementation, the variation in written track width (e.g., W1 v. W2) of the bottom and top tracks is accomplished by operating a HAMR write head at two different respective power levels. In another implementation, the variation in written track width of the bottom and top tracks is accomplished by using two write poles of different write widths to write the wide and narrow tracks, respectively.

The top and bottom data tracks may store data at different linear densities. For example, data may be stored in the bottom tracks at a first linear density and data may be stored in the top tracks at a second linear density that is somewhat lower than the first linear density.

If the linear density of the top data tracks is selected to be lower than an experimentally-defined threshold, then each of the top data tracks is randomly writeable. In contrast, the bottom data tracks may not be randomly writable. For example, the bottom data track 405 remains randomly writeable up until the point in time when data is first written to either of adjacent top data tracks 404 or 406. Once the bottom data track 405 is bounded by a top data track that stores data, updating data of the bottom data track 405 entails reading, caching, and subsequently re-writing any data stored in the adjacent data tracks 404 and 406.

In this sense, updating data in a bottom track can entail taking a performance "penalty" (e.g., by reading, caching, and rewriting data on other data tracks). This penalty is taken less frequency if the bottom tracks are used to store data that is not accessed or updated very often. Accordingly, arrows in FIG. 4 indicate an example of directed storage of hot and cold data based on written track width.

In particular, the arrows in FIG. 4 indicate that hot data is directed to and stored in the top data tracks with a narrow written track width, while cold data is directed to and stored in the bottom data tracks having the wider written track width. The storage device controller may identify data as hot or cold based on, for example, write attributes such as write frequency or write recency associated with an LBA of the data.

If the IMR region 400 is included in a HAMR recording system, the device controller selects a power level to operate a heat source during a data write. The power of the heat source can be selected based on the write attributes of incoming data. For example, data identified as hot may be written while operating the heat source at a first power while data identified as cold may be written while operating the heat source at a second power. In one implementation, the storage device controller selects a low power level for data associated with top data tracks in the IMR region 400, and a high power level for data associated with the bottom data tracks in the IMR region 400. In some implementations, more than two power levels may be utilized for writing data to the data tracks in the IMR region 400.

Although FIG. 4 primarily contemplates storage location selection based on write frequency of data, a storage controller may additionally take into account other write attributes of the data when selecting a storage location within the IMR region 400. If, for example, incoming data is associated with a high write frequency and is also performance sensitive, the controller may direct the data to one or more top tracks of the region 418 that are near the OD of the magnetic disc 400 where performance is higher. If, on the other hand, incoming data is associated with a low write frequency but is performance sensitive, the storage device controller may direct the data to one or more bottom tracks of the region 418 that are near the OD of the magnetic disc 400 where performance is higher. In the same respect, data that is not performance sensitive may be directed to regions of the magnetic disc 400 other than the outer diameter.

In one implementation, the top tracks in the IMR region 400 are included as part of a disc cache where frequently accessed data is redundantly stored. The bottom tracks are used for storage of user data and are not part of the disc cache.

Figure 5:
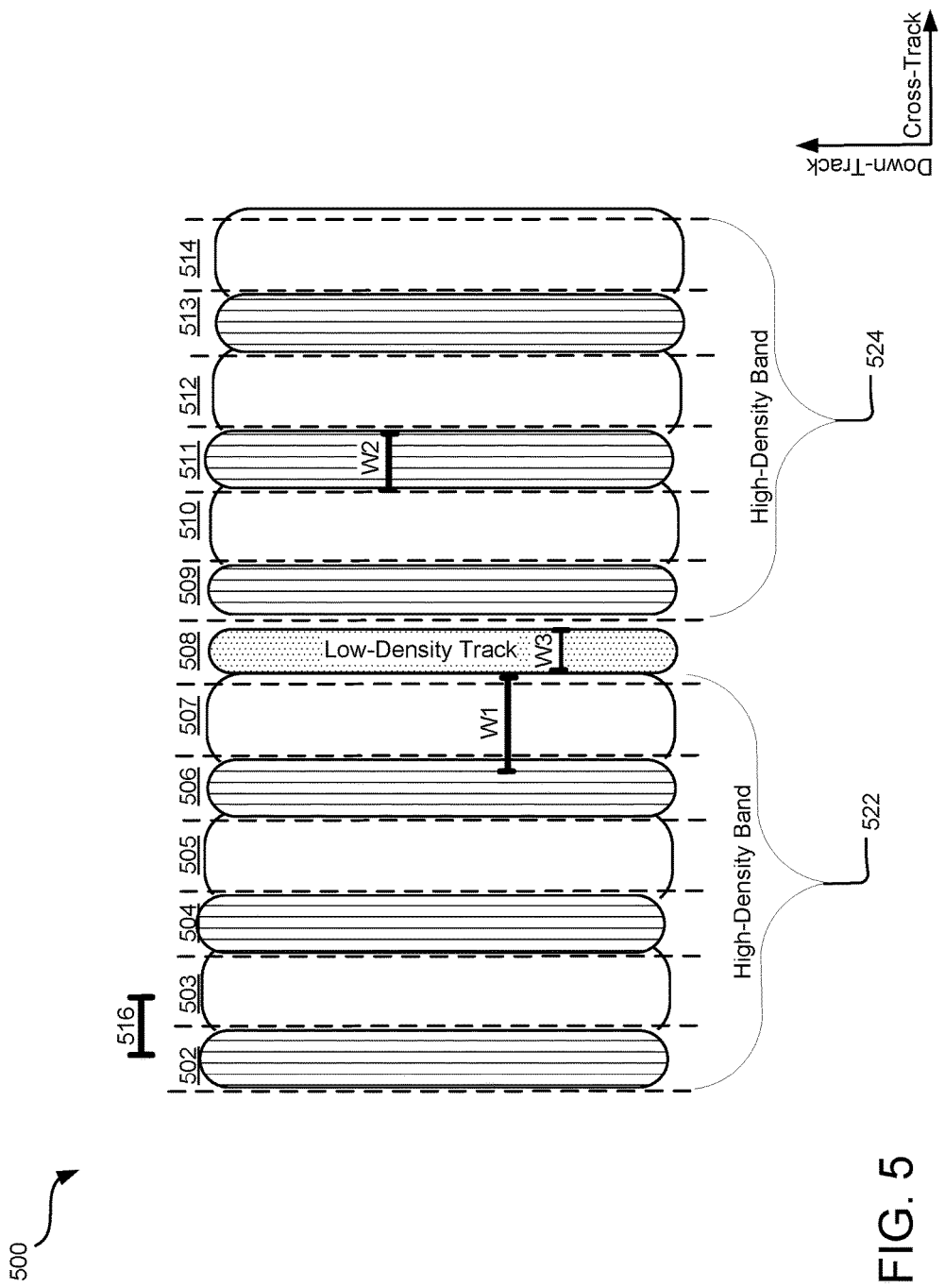
FIG. 5 illustrates example data direction and storage within a region of a storage medium implementing yet another IMR technique.

FIG. 5 illustrates data direction and storage within a region 500 of a storage medium implementing another IMR technique. The IMR region 500 includes bottom tracks of a first written track width W1 (e.g., bottom tracks 503, 505, 507, 510, 512, 514) and top tracks of a second, narrower written track width W2 (e.g., top tracks 502, 504, 506, 509, 511, and 513). Some aspects of the illustrated IMR technique are the same or similar to those shown and described above with respect to FIG. 4. For example, data may be stored in the bottom tracks at a first linear density and data may be stored in the top tracks at a second linear density that is somewhat lower than the first linear density.

If linear densities of the top and bottom data tracks are pushed to upper limits (e.g., beyond that of the implementation of FIG. 4), all of the data tracks may cease to be randomly writable but provide for a very high total ADC. For example, a linear density of the top data track 504 may be selected so that the top data track 504 can be written exactly once without significantly degrading data of the adjacent (e.g., previously-written) bottom data tracks 503 and 505. Maximizing linear densities in this way can provide for a large increase in total ADC as compared to implementations where each individual data track in an IMR system has a low enough linear density to be randomly writable.

In one implementation, the use of very high linear densities is achieved by implementing write scheme that treats "data bands" (e.g., groupings of three or more adjacent data-storing data tracks) as individual write units. For example, the data tracks 502-507 represent a high-density data band 522 that is re-written in its entirety each time any data track within the high-density data band 522 is updated. The data tracks 509-514 represent another high-density data band 524 treated as an individual write unit. Different high-density data bands on the magnetic disc can be of uniform or variable size.

Adjacent high-density data bands (e.g., 522 and 524) are separated from one another by one or more low-density data tracks (e.g., a low-density data track 508). For example, the data track 508 may be a low-density data track that stores data at a linear density lower than a linear density of data in any data tracks the high-density data bands 522 and 524. Unlike data tracks in the high-density data bands 522 and 524, the low-density data track 508 is randomly writeable and can be updated without updating or re-writing data of any other data track on the magnetic disc. The low-density track 508 has a third written track width W3, which may be less than or equal to either the first written track width W1 or the second written track width W2.

A controller (not shown) selects a written track width for a potential data storage location based on write attributes of incoming data. In one implementation, the controller selects a written track width based on a size of a data write request (e.g., a size of an incoming file). If, for example, data of a write request is small enough to be stored entirely within the low-density track 508, the file can be sequentially read and updated at random. In contrast, large data files spanning multiple data tracks may be better suited for storage within one or more high-density bands (e.g., the high density band 522) that can be read more efficiently than a series of radially distributed low-density tracks.

In another implementation, the controller selects a written track width for a potential storage location based on data type. For example, user data is stored in the high-density data bands 522 and 522, while system data is stored in the low-density track 508. In general, the term "system data" refers to internal drive system data unknown or inaccessible to a host device. For example, system data may include media defect tracking information; write count data (e.g., how many writes have been performed on various bands of data), and other attributes managed exclusively by the storage device controller. In some cases, an end user is not aware when system data writes are taking place. Therefore, the relatively high seek time associated with writes to the various low-density tracks may be less noticeable to the user if the low-density tracks are used to store system data.

If the region 500 is included in a HAMR recording system, the device controller selects a power level to operate a heat source based on the write attributes of the incoming data. In one implementation, a data type (system data, user data) corresponds to a particular heat source power and/or write location. For example, a low power level is selected for data associated with low-density tracks (e.g., the low-density track 508); a medium power level is selected for data associated with top data tracks in the high density band 522; and a high power level is selected for data associated with the bottom data tracks in the high density band 522.

In one implementation, a track pitch is defined differently for two or more regions of the magnetic disc 500, depending on a type of data primarily stored in each region. For example, low density tracks (e.g., a low density track 508) storing system data may have a first track pitch; high density data bands 522 and 524 may have a second track pitch; and a cache region (not shown) may have a third track pitch.

Figure 6:
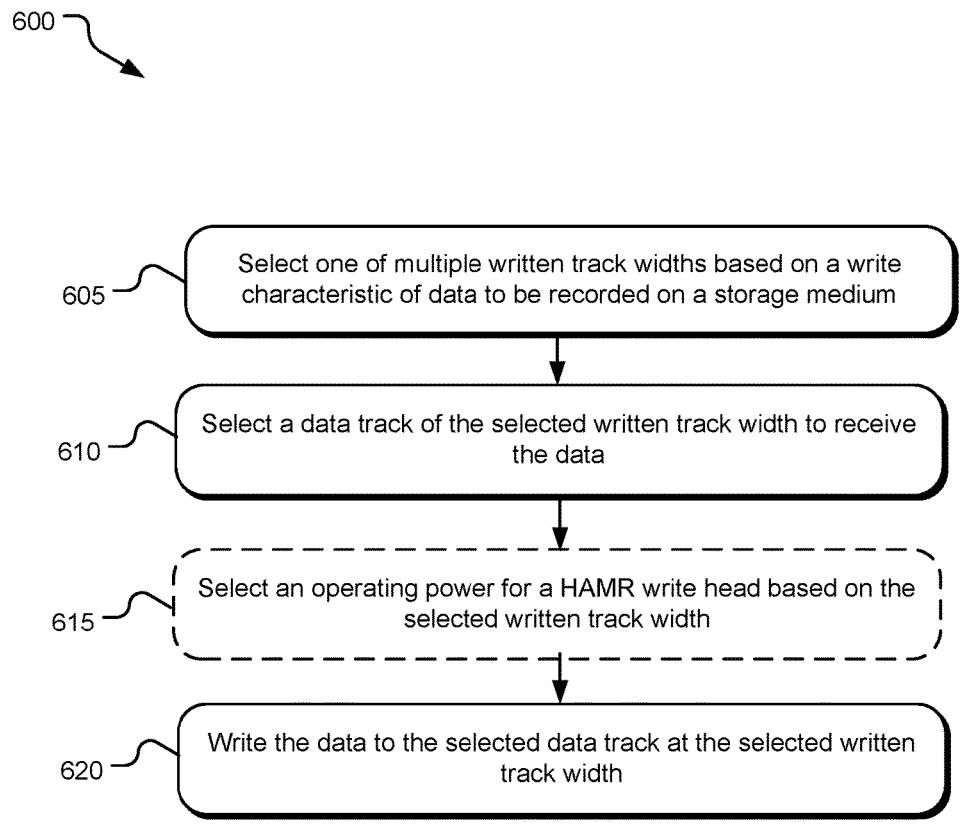
FIG. 6 illustrates example operations for writing data in a storage system implementing variable written track widths for attribute-based storage.

FIG. 6 illustrates example operations for writing data in a storage system implementing variable written track widths for attribute-based storage. A first selection operation 605 selects a written track width for a potential write location based on a write attribute of data to be recorded at the potential write location. Write attributes that may influence the selection of the written track width include without limitation a type of data (e.g., user data or system data), a write frequency of data, a write recency (e.g., a time since the data was last updated), performance sensitivity of the data, file size, etc.

In some implementations employing IMR techniques, a wide written track width is selected for storage of cold data (e.g., associated with a low write frequency), while a narrower written track width is selected for storage of hot data (e.g., associated with a high write frequency). In still other implementations, a wide written track width is selected for storage of hot data. For example, a storage medium may include a cache region that stores certain types of hot data in randomly writable data tracks of wider written width than other data tracks on the storage medium.

In other implementations, written track width is associated with a particular type of data or a size of data file. For example, system data or very small data files may be stored on data tracks of especially narrow written track width. For example, of a data track of narrow written width may be selected to store a data file that is small enough to fit entirely within the data track.

Another selection operation 610 selects a data track of the selected written track width to receive the data. In some implementations, the selection operation 610 is based on storage characteristics of the selected data track in addition to written track width. For example, a high-performance region of a magnetic disc may be selected if the data is especially performance-sensitive and a low-performance region may be selected if the data is not performance-sensitive.

If the selected data track is included in a HAMR system, a selection operation 615 selects an operating power for a heat source of a HAMR write head based on the selected written track width. For example, a low power may be selected if the selected written track width is narrow, while a higher power may be selected if the selected written track width is wide. A write operation 620 writes the data to the selected data track so that data bits of the recorded data span the selected written track width.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. One or more computer-readable storage media of a tangible article of manufacture encoding computer-executable instructions for executing on a computer system a computer process, the computer process comprising:
    selectively writing incoming data to a series of tracks consisting of a first series of alternating data tracks in a first radial zone of a storage medium responsive to a determination that the incoming data is cache data, the first series of alternating data tracks excluding a second series of alternating data tracks interlaced with the first series.

2. The one or more computer-readable storage media of claim 1, wherein the computer process further comprises:
    writing the incoming data to the first series of alternating data tracks in the first radial zone at first written track width responsive to a determination that the incoming data is cache data; and writing the incoming data to a second radial zone of the storage medium at a second track width different from the first written track width responsive to a determination that the incoming data is non-cache data.

3. The one or more computer-readable storage media of claim 2, wherein the first written track width is larger than the second track width.

4. The one or more computer-readable storage media of claim 2, wherein the computer process further comprises:
writing the incoming data with a first write head having a first write pole width responsive to a determination that the incoming data is cache data; and
writing the incoming data with a second write head having a second write pole width responsive to a determination that the incoming data is non-cache data, the first write pole width larger than the second write pole width.

5. The one or more computer-readable storage media of claim 2, wherein the computer process further comprises:
writing the incoming data at a first linear density responsive to a determination that the incoming data is cache data; and
writing the incoming data at a second linear density a responsive to a determination that the incoming data is non-cache data, the first linear density higher than the second linear density.

6. The one or more computer-readable storage media of claim 1, wherein the computer process further comprises selecting a higher power level for operating a HAMR head when the incoming data is cache data than when the incoming data is non-cache data.

7. One or more computer-readable storage media of a tangible article of manufacture encoding computer-executable instructions for executing on a computer system a computer process, the computer process comprising:
writing data to a first set of alternating data tracks on a storage medium with a first write head having a first write pole width responsive to a determination that at least one of a write frequency and write recency of the data is higher than a first predefined threshold; and
writing data to a second set of alternating data tracks with a second write head having a second write pole width responsive to a determination that the at least one of write frequency and write recency is lower than a second predefined threshold, wherein the first set of alternating data tracks is interlaced with the second set of alternating data tracks, the first write pole width being smaller than the second write pole width.

8. The one or more computer-readable storage media of claim 7, wherein the first set of alternating data tracks are randomly writable data tracks and the second set of alternating data tracks are not randomly writable data tracks.

9. The one or more computer-readable storage media of claim 7, wherein the first set of alternating data tracks consists of top data tracks in an interlaced magnetic recording scheme and the second set of alternating data tracks consists of bottom data tracks in an interlaced magnetic recording scheme.

10. The one or more computer-readable storage media of claim 7, wherein writing the data to the first set of alternating data tracks further comprises writing the data at a first linear density and wherein writing the data to the second set of alternating data tracks further comprises writing the data a second linear density higher than the first linear density.

11. The one or more computer-readable storage media of claim 7, wherein writing the data to the first set of alternating data tracks further comprises writing the data to a determination that the write frequency of the data is higher than the first predefined threshold.

12. The one or more computer-readable storage media of claim 7, wherein writing the data to the second set of alternating data tracks further comprises writing the data responsive to a determination that the write frequency of the data is lower than the second predefined threshold.

13. An apparatus comprising:
a storage device controller configured to:
write incoming data to a first radial zone of a storage medium at a first written track width responsive to a determination that the incoming data is cache data; and
write the incoming data to a second radial zone of the storage medium at one or more written track widths different from the first written track width responsive to a determination that the incoming data is non-cache data, the first written track width and the second written track width each defining an area on the storage medium that is initially magnetized as the area rotates through a magnetic field generated by a write element.

14. The apparatus of claim 13, wherein the first written track width is wider than at least one other written track width of a data track storing non-cache data.

15. The apparatus of claim 13, wherein the storage device controller is further configured to:
control a first write head to write the incoming data responsive to the determination that the incoming data is cache data; and
control a second write head to write the incoming data responsive to the determination that the incoming data is non-cache data, the first write head having a write pole with a larger width than a write pole of the second write head.

16. The apparatus of claim 15, wherein the storage device controller is further configured to:
control the first write head to write the incoming data at a first linear density responsive to the determination that the incoming data is cache data; and
control the second write head to write the incoming data at a second linear density responsive to the determination that the incoming data is non-cache data, the first linear density higher than the second linear density.

17. The apparatus of claim 13, wherein the storage device controller selects a higher power level for operating a HAMR head heat source when the incoming data is cache data than when the incoming data is non-cache data.

18. The apparatus of claim 13, wherein the storage device is further configured to:
write the incoming data exclusively to alternating data tracks within the first radial zone responsive to a determination that the incoming data is cache data.

* * * * *